United States Patent [19]
Svaldi et al.

[11] 3,752,233
[45] Aug. 14, 1973

[54] HYDRAZINE OVERFLUSH TREATMENT IN HYDRAULIC FRACTURING

[75] Inventors: Marvin A. Svaldi, Morrison; Bruce L. Knight, Littleton, both of Colo.

[73] Assignee: Marathon Oil Company, Findlay, Ohio

[22] Filed: Dec. 15, 1971

[21] Appl. No.: 208,461

[52] U.S. Cl. .............................. 166/308, 166/305 R
[51] Int. Cl. ...................... E21b 43/25, E21b 43/26
[58] Field of Search ............... 166/305 R, 308, 307, 166/274, 311, 312

[56] References Cited
UNITED STATES PATENTS

| | | | |
|---|---|---|---|
| 3,482,636 | 12/1969 | Crowe | 166/307 |
| 3,254,719 | 6/1966 | Root | 166/308 |
| 3,482,635 | 12/1969 | Pasini | 166/305 R |
| 3,529,669 | 9/1970 | Tietz | 166/307 |
| 3,556,221 | 1/1971 | Haws et al. | 166/305 R |
| 3,508,613 | 4/1970 | Huff et al. | 166/307 |

*Primary Examiner*—Stephen J. Novosad
*Attorney*—Joseph C. Herring, Jack L. Hummel et al.

[57] ABSTRACT

Improved fracturing of subterranean reservoirs with fracturing fluids containing high molecular weight polymers, e.g., polyacrylamides, is obtained by first fracturing the formation with the fracturing fluid, and thereafter injecting 5–1,000 gallons per vertical foot of reservoir of an aqueous solution containing 0.005 percent to about 30 percent by volume of hydrazine. The hydrazine tends to increase permeability to the flow of reservoir fluids, the permeability having been reduced by the high molecular weight polymers in the fracturing fluid.

11 Claims, No Drawings

HYDRAZINE OVERFLUSH TREATMENT IN HYDRAULIC FRACTURING

BACKGROUND OF THE INVENTION

1. Field of the Invention

This invention relates to an improved fracturing process. More specifically, it relates to an overflush treatment after a subterranean reservoir has been fractured with a fracturing fluid containing high molecular weight polymer, such as polyacrylamides, partially hydrolyzed, high molecular weight polyacrylamides, guar gum polymers, etc. The hydrazine overflush restores permeability, the permeability having been adversely influenced by the high molecular weight polymer in the fracturing fluid.

2. Description of the Prior Art

Water-based fracturing fluids have gained popularity principally because of lower fluid pumping costs as compared to corresponding oil-based fluids. A wide variety of water-soluble polymers have found particular use in water-based fracturing fluids. The polymers are used as drag reduction agents (i.e., to reduce drag during pumping), impart high viscosity to the fluid, act as good dispensing agents, etc. Examples of such polymers include polyacrylamides; partially hydrolyzed polyacrylamides, such as the Pusher polymers marketed by Dow Chemical Co., Midland, Mich.; guar gum and like polymers. It has been reported that about two-thirds of all domestic oil wells which undergo fracture treatment are fractured with water-based fluids. Another advantage of water-based fracturing fluids is that they have higher specific gravities, as compared to oil-based fracturing fluids, which creates a higher hydraulic head; they also provide greater suspending power for propping agents.

As mentioned previously, water-based fracturing fluids generally create less friction drag than do corresponding oil-based fluids. Friction-reduction agents are used in water-based fracturing fluids to further reduce friction. Examples include polyacrylamides, partially hydrolyzed, high molecular weight polyacrylamides (see U. S. Pat. No. 3,254,719 to Root as an example), guar gum, cellulose derivatives, and other like polymers.

U. S. Pat. No. 3,254,719 to Root teaches reducing friction loss in well fracturing fluids by incorporating up to 4 percent by weight of a high molecular weight polyacrylamide—the polyacrylamides are preferably partially hydrolyzed to the extent of 20–40 percent of the available amide groups.

It has been reported that the use of friction-reducing agents in water tends to suppress turbulence. At high injection rates, suppression of turbulent flow can be very beneficial from an energy requirement standpoint, i.e., higher injection rates for a given surface energy are usually obtained. Also, it has been reported that high molecular weight, linear polymers, such as polyacrylamides, tend to reduce the swirling and eddying of the fluids while in motion and this, in turn, suppresses turbulence. The viscosity of the water-based fracturing fluids can be increased with gelling agents. Examples of gelling agents include guar gum, hydroxyethyl cellulose, polyacrylamides, partially hydrolyzed polyacrylamides, and like polymers. Such an increase in the viscosity beneficially influences "bleed-off" and also assures good suspension and displacement of propping agents within the fracturing fluid. In addition, beneficial fluid loss properties are imparted to the fracturing fluid. Commonly used fluid loss agents include starch, betonite, silica flour, guar gum, surfactants, etc.

Surfactants are incorporated into water-based fracturing fluids to reduce the interfacial tension and the resistance to "return flow." Also, surfactants provide a foam-stabilizing property. However, surfactants can adsorb on reservoir rock and thus adversely influence relative permeability characteristics of the reservoir rock.

Generally speaking, the high molecular weight polymers used in water-based fracturing fluids tend to adversely influence relatively permeability to the flow of fluids in the reservoir. One of the known disadvantages with polyacrylamide and partially hydrolyzed products thereof is that they tend to adsorb on and/or plug reservoir rock and thus reduce permeability to the flow of fluids after fracturing is completed.

Generally speaking, after fracturing of the formation and before the well is returned to operation, it is necessary to "break down" or "degrade" a viscous fracturing fluid so that normal flow properties can be realized. Unless this step is carried out effectively, flow characteristics of the well may be severely impaired. For example, the presence of viscous fracturing fluids may seriously inhibit the flow of hydrocarbons (oil or gas) from the matrix of the reservoir to the fracture and subsequently the wellbore. The fracturing fluids generally contain a breaker to accomplish such a breakdown. Such breakers are usually oxidizing agents, enzymes (especially with guar gum), acids, etc.

SUMMARY OF THE INVENTION

Applicants have discovered an improved method of fracturing subterranean reservoirs. This invention is operative with a fracturing fluid which contains a high molecular weight polymer, e.g., partially hydrolyzed polyacrylamides. The fracturing fluid can be oil-based, but is preferably a water-based, fracturing fluid. Applicants' improvement is an overflush following the fracture treatment wherein about 5 to about 1,000 gallons of an aqueous hydrazine solution is injected into the fractured reservoir per vertical foot of formation. Preferably, the wellbore is flushed of the fracturing fluid before the aqueous hydrazine solution is injected. Such is especially preferred where the fracturing process is "sanded out."

DESCRIPTION OF THE PREFERRED EMBODIMENTS

Applicants' invention is especially useful in the fracturing of water injection wells. However, fracturing of producing wells, including both oil production and gas production wells, is useful with the invention. The fracturing fluid used to fracture the wells can be an oil-based fracturing fluid or like fracturing fluid, or it can be, and preferably is, a water-based fracturing fluid. However, the fracturing fluid, to be operative with this invention, must contain a polymer which tends to adversely influence the flow characteristics of the well as it is returned to operation. For example, high molecular weight, partially hydrolyzed polyacrylamides such as the Pusher polymers, tend to adsorb on and/or plug reservoir rock and thus adversely influence permeability to the flow of water once the injection well is returned to service. Applicants' invention is directed toward restoring permeability characteristics to the flow of reservoir fluids once the well is returned to production.

The fracturing fluids are preferably water-based fracturing fluids which contain polymers such as polacrylamides, partially hydrolyzed, high molecular weight polyacrylamides, guar gum, cellulose derivatives, and other agents used to impart viscosity characteristics, drag reduction characteristics, and other properties to the fracturing fluid. Gelling agents such as guar gum, hydroxyethyl cellulose, polyacrylamides, partially hydrolyzed polyacrylamides, and other like agents can be present in the fracturing fluid. In addition, other well-known additives such as propping agents, bactericides, scale inhibitors, oxidation inhibitors, surfactants, alcohols, fluid loss control agents, acids, bases, etc., can be present. The reference "Hydraulic Fracturing," Howard and Fast, copyright 1970, is illustrative of fracturing fluids and different components that are useful within these fluids.

Applicants have discovered a novel way of overcoming the adverse permeability effect by overflusing, i.e., injecting behind the fracturing fluid an aqueous hydrazine solution. Of course, the aqueous fracturing fluid is preferably flushed out of the annulus of the wellbore before the aqueous hydrazine solution is injected into the wellbore. Optionally, the wellbore can be bailed out; such is preferred where the fracturing process is "sanded out." The aqueous hydrazine solution is preferably made up with relatively soft water, i.e., containing less than about 200 ppm of total divalent cations and also containing less than 1,000 ppm of total dissolved solids. The hydrazine concentration in the aqueous solution can be about 0.005 percent to about 30 percent by volume, preferably 0.0075 percent to about 5 percent by volume, and more preferably 0.01 percent to about 3 percent by volume. It is preferred that the hydrazine be handled in diluted form due to hazards associated with the material.

Volume amounts of the aqueous hydrazine solution to be injected after the fracturing fluid include about 5 gallons to about 1,000 gallons, and preferably about 40 gallons to about 800 gallons and more preferably about 50 gallons to about 500 gallons of the aqueous hydrazine solution per vertical foot of reservoir that is fractured. Preferably, the fracture is completely saturated with the aqueous hydrazine solution. Thus, where a long fracture or extensive fracturing profile is accomplished, the volume amounts of the aqueous hydrazine will be large. Yet, on the other hand, where the fracturing is rather limited, relatively small amounts of the aqueous hydrazine solution are useful.

Due to the reactivity of the hydrazine, it is desired that few components, if any, be incorporated into the aqueous hydrazine solution. And, if additional components are incorporated into the solution, it is desired that such components be substantially unreactive with hydrazine.

Where bridging materials are used to obtain a more uniform fracturing profile, for example in a heterogeneous formation, hydrazine has the additional benefit of chemically attacking such bridging materials. Generally speaking, the bridging materials are temperature-sensitive and tend to solubilize upon contact at reservoir temperatures. Examples of such bridging materials include naphthalene and rock salt. However, hydrazine is beneficial to facilitate removal of the bridging materials by chemically attacking same.

EXAMPLES

To illustrate working embodiments of this invention, the following examples are presented. Unless otherwise specified, all percents are based on volume. "Screen factor" is defined in "Factors Influencing Mobility Control by Polymer Solutions," by R.R. Jennings, J.H. Rogers, and T.J. West, *Journal of Petroleum Technology*, March, 1971, pp. 391–401. As is noted in the following examples, hydrazine tends to reduce polymer solution viscosity and screen factor; this indicates that the polymer is degraded by contact with the hydrazine and implies that rock permeability, which is adversely influenced by polymer adsorption and/or plugging, can be substantially restored. The rate of polymer degradation is controlled by varying the concentration of hydrazine in solution. An unexpected anomaly is the fact that very dilute concentrations of hydrazine tend to be very effective as compared to higher concentrations of hydrazine.

EXAMPLE I

To show the influence of hydrazine on screen factor and viscosity, the following experiment was performed. In an aqueous solution containing 1,200 ppm of Dow Pusher 700 polymer (Pusher is a trademark of Dow Chemical Co., Midland, Mich., U.S.A.), the water contains about 500 ppm of total dissolved solids, there is added an aqueous solution of hydrazine containing sufficient hydrazine such that hydrazine concentration in the aqueous polymer solution is 0.1 percent. The initial screen factor and viscosity at 6 rpm on a Brookfield Viscometer at 72° F. is measured at 39.7 and 71.4 cp, respectively. After 1 day, 2 days, and 7 days, measurements were made as indicated in Table 1.

TABLE 1

Effect of Hydrazine on Polymer Characteristics

| | \multicolumn{4}{c}{Time,Days} |
|---|---|---|---|---|
| Dow 700 Pusher (1200 ppm) Hydrazine conc.: 0.1 vol. % | 0 | 1 | 2 | 7 |
| Screen factor | 39.7 | 12.8 | 9.34 | 3.81 |
| Viscosity, cp (6 rpm, 72°F) | 71.4 | 36.9 | 28.8 | 10.6 |

To another identical (1,200 ppm) polyacrylamide solution, there is added an aqueous solution containing sufficient aqueous hydrazine solution such that hydrazine concentration in the aqueous polymer solution is 1.0 percent. Screen factor and viscosity measurements are made as indicated in Table 2:

TABLE 2

Effect of Hydrazine on Polymer Characteristics

| | \multicolumn{4}{c}{Time,Days} |
|---|---|---|---|---|
| Dow 700 Pusher (1200 ppm) Hydrazine conc.: 1.0 vol. % | 0 | 1 | 2 | 7 |
| Screen factor | 39.7 | 36.4 | 33.7 | 31.0 |
| Viscosity, cp | 71.4 | 62.3 | 58.4 | 44.5 |

EXAMPLE II

To further illustrate the influence of hydrazine on the partially hydrolyzed high molecular weight polymer, aqueous hydrazine solution sufficient to give a hydrazine concentration of 0.1 percent in the aqueous polymer solution is added to an aqueous solution containing 700 ppm of Dow Pusher 700 polymer, the water containing 500 ppm of total dissolved solids. The screen factor and viscosity measurements are indicated in Table 3:

TABLE 3

Effect of Hydrazine on Polymer Characteristics

| Dow 700 Pusher (700 ppm) Hydrazine conc.: 0.1 vol. % | Time, Days | | | |
|---|---|---|---|---|
| | 0 | 1 | 2 | 7 |
| Screen Factor | 28.6 | 6.0 | 3.81 | 1.56 |
| Viscosity, cp (6 rpm, 72°F) | 31.5 | 10.4 | 8.6 | 5.3 |

To the same solution containing the partially hydrolyzed high molecular weight polyacrylamide there is added an aqueous solution containing sufficient hydrazine to give a hydrazine concentration of 1.0 percent in the aqueous polymer solution. Measurements were made as indicated in Table 4:

TABLE 4

Effect of Hydrazine on Polymer Characteristics

| Dow 700 Pusher (700 ppm) Hydrazine conc.: 1.0 vol. % | Time, Days | | | |
|---|---|---|---|---|
| | 0 | 1 | 2 | 7 |
| Screen factor | 28.6 | 24.5 | 24.6 | 17.7 |
| Viscosity, cp (6 rpm, 72°F) | 31.5 | 28.4 | 27.8 | 20.3 |

Examples I and II indicate that the 0.1 percent concentration of hydrazine tends to work very beneficially. Of course, the lower the concentration of hydrazine, the more economically advantageous is the process.

EXAMPLE III

A water injection well is fractured with a water-based fracturing fluid containing about 0.25 percent by weight of a partially hydrolyzed, high molecular weight polyacrylamide, a propping agent, and a bactericide. After the well is fractured, the wellbore is flushed of the fracturing fluid. Thereafter, 200 gallons of an aqueous hydrazine solution per vertical foot of fractured reservoir, the solution containing 0.1 percent hydrazine, is injected into the formation. Thereafter, water is injected into the injection well using normal operating procedures. An increase in injectivity index is realized.

The aqueous hydrazine overflush can be used in conjunction with breakers in the fracturing fluid. Of course, there are obvious extensions of this invention, and such are intended to be included within the scope of the invention.

What is claimed is:

1. An improved process of fracturing a subterranean reservoir with a fracturing fluid containing a high molecular weight polymer which tends to adversely influence permeability to the flow of fluids within the reservoir after the fracturing process is effected in the reservoir, the improvement comprising injecting after the fracturing fluid about 5 gallons to about 1,000 gallons per vertical foot of reservoir of an aqueous hydrazine solution containing about 0.005 percent to about 30 percent by volume of hydrazine.

2. The process of claim 1 wherein the fracturing fluid is flushed from the wellbore before the aqueous hydrazine solution is injected into the reservoir.

3. The process of claim 1 wherein about 40 gallons to about 800 gallons of the aqueous hydrazine solution is injected per vertical foot of the reservoir.

4. The process of claim 1 wherein about 50 gallons to about 500 gallons of the aqueous hydrazine solution is injected per vertical foot of reservoir.

5. The process of claim 1 wherein the hydrazine concentration is about 0.0075 percent to about 5 percent by volume.

6. The process of claim 1 wherein about 0.01 percent to about 3 percent volume is the concentration of hydrazine.

7. The process of claim 1 wherein the fracturing fluid contains a partially hydrolyzed, high molecular weight polyacrylamide.

8. An improved process of fracturing a subterranean reservoir wherein an aqueous fracturing fluid comprised of a partially hydrolyzed, high molecular weight polyacrylamide is injected into a well bore in fluid communication with a reservoir at a pressure sufficient to fracture the formation, the improvement comprising injecting after the fracturing fluid about 5 gallons to about 1,000 gallons of an aqueous hydrazine solution per vertical foot of reservoir, the hydrazine concentration being about 0.0075 percent to about 5 percent by volume.

9. The process of claim 8 wherein the hydrazine concentration is about 0.01 percent to about 3 percent by volume.

10. The process of claim 8 wherein about 40 gallons to about 800 gallons of the aqueous hydrazine solution per vertical foot of reservoir is injected into the reservoir.

11. The process of claim 8 wherein about 50 gallons to about 500 gallons of the aqueous hydrazine solution per vertical foot of reservoir is injected.

* * * * *